United States Patent [15] 3,681,455
Mirviss [45] Aug. 1, 1972

[54] HYDROXYNAPHTHOIC ANHYDRIDES
[72] Inventor: Stanley B. Mirviss, Stamford, Conn.
[73] Assignee: Stauffer Chemical Company, New York, N.Y.
[22] Filed: Oct. 9, 1970
[21] Appl. No.: 79,668

Related U.S. Application Data

[63] Continuation-in-part of Ser. No. 788,106, Dec. 30, 1968, abandoned.

[52] U.S. Cl. .......................... 260/545 R, 260/45.95
[51] Int. Cl. .............................................. C07c 153/00
[58] Field of Search ...................................... 260/545

[56] References Cited

UNITED STATES PATENTS 3,554,989  1/1971  Stamm .......................... 260/79.5

Primary Examiner—Lorraine A. Weinberger
Assistant Examiner—Robert Gerstl
Attorney—Wayne C. Jaeschke, Martin Goldwasser and Daniel S. Ortiz

[57] ABSTRACT

Vinyl polymer compositions are stabilized against degradation and discoloration due to heat by adding to the polymer a stabilizing amount of a novel compound of the formula:

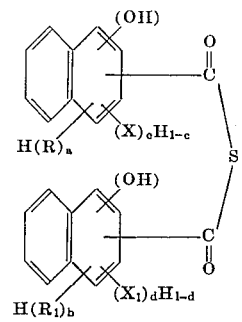

wherein H(R) and H($R_1$) are alkyl, alkyl halide or alkoxy groups containing from one to about 12 carbon atoms, X and $X_1$ are halogen, and $a$, $b$, $c$, and $d$ are integers having a value of zero or 1.

6 Claims, No Drawings

HYDROXYNAPHTHOIC ANHYDRIDES

RELATED APPLICATION

This application is a continuation-in-part of application Ser. No. 788,106, filed Dec. 30, 1968, now abandoned.

TECHNICAL DISCLOSURE OF THE INVENTION

According to the present invention there are provided novel hydroxynaphthoic thiolanhydrides of the formula:

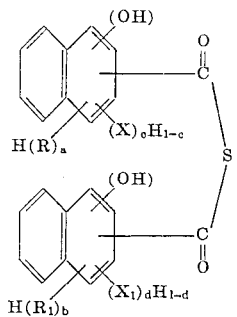

wherein H(R) and H($R_1$) are alkyl, alkyl halide or alkoxy groups containing from one to about 12 carbon atoms and preferably from one to eight carbon atoms and most preferably from one to six carbon atoms, X and $X_1$ are halogen and $a$, $b$, $c$, and $d$ are integers having a value of zero or 1; and, heat stabilized compositions comprising the novel compounds intimately admixed with vinyl polymers.

A preferred group of these compounds are those corresponding to the formula:

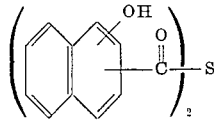

The above described compounds are found to be particularly effective as heat stabilizers in vinyl polymers such as the polyvinyl halides, polyvinylidene halides; polyolefins such as polyethylene, chlorinated polyethylene and polypropylene; acrylonitrile-butadiene-styrene resins; copolymers made from monomers of which at least one is a halogen containing monomer; and, post chlorinated polymers.

The term alkyl is used herein to denote a radical containing from one to about 12 carbon atoms derived from an aliphatic hydrocarbon by the removal of one hydrogen atom. Illustrative of the alkyl moieties represented by H(R) and H($R_1$) are methyl, ethyl, propyl, isopropyl, butyl, tertiary butyl, amyl, nonyl and dodecyl. The term haloalkyl is used herein to denote an alkyl radical in which one or more hydrogen atoms have been replaced by a halogen atom.

The term alkoxy as used herein means an alkyl or haloalkyl radical which is attached to the remainder of the molecule by oxygen. Illustrative of the alkoxy radicals are moieties such as methoxy, ethoxy, propoxy, isopropoxy, butoxy, and the like.

The term halogen as used herein means fluorine, chlorine, bromine and iodine.

The substituents R, $R_1$ and X and $X_1$ and the subscripts $a$, $b$, $c$, and $d$ can be the same or different.

Representative compounds suitable for use in accordance with the present invention include:

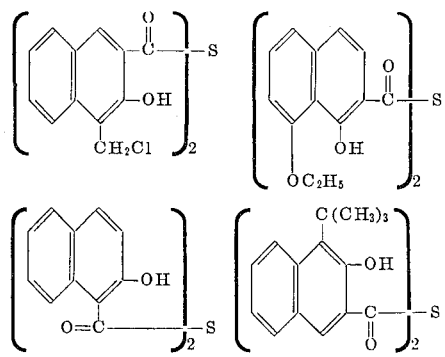

The novel compounds of the present invention are particularly effective stabilizing agents when the naphthyl group is substituted with a hydroxyl group in an ortho position to the thiolic carboxy group or when the alkyl, or alkoxy radical or halogen is substituted in an ortho position to the hydroxy group. The compounds are most effective when the alkyl or alkoxy radical substituted in an ortho position to the hydroxy group contains from 3 to 8 carbon atoms.

The novel thiolanhydrides of the present invention can be prepared in good yields by reacting a thiolic acid and an acyl chloride in a suitable solvent at from 0° C. to about 150° C. The temperature range depends upon the particular reactants involved and the solvent employed. The reaction may be carried out at from subatmospheric to superatmospheric pressure. Provision must, however, be made for removal of the HCl formed from the reaction. This may be accomplished by the use of an acid acceptor such as pyridine or when operating near atmospheric pressure by the use of an inert gas purge through the system.

Solvents suitable for the reaction are aromatic solvents such as benzene, toluene, and xylene, chlorinated solvents such as chloroform, carbon tetrachloride and chlorobenzene, paraffinic solvents such as heptane, hexane and cyclohexane, and solvents such as ether, tetrahydrofuran, acetonitrile, and pyridine.

For example, 1-hydroxy-2-naphthoic thiolanhydrides can be prepared by reacting 1-hydroxy-2-naphthoyl chloride and 1-hydroxy-2-naphthoic thiolacid in an inert solvent at 80° C. when the generation of HCl has ceased, the solvent is removed and the 1-hydroxy-2-naphthoic thiolanhydride is crystallized.

The acyl chlorides useful for the practice of the present invention can be prepared by the reaction of the desired acid with phosphorus trichloride or thionyl chloride.

The thiolic acid can be prepared by reacting an acyl chloride with $H_2S$ in an anhydrous acid acceptor such as pyridine at from −10° C. to about 100° C. Preferably from about 0° C. to about 50° C.

The thiolanhydrides useful in the practice of the present invention can also be prepared by reacting a suitable acid chloride with a slight excess of $Na_2S$ in a solution with water at from −5° C. to about 100° C. and at a pH range generally from 8 to about 10. The reaction can be conducted at subatmospheric to superatmospheric pressure. The thiolanhydride can be recovered from the water. This method is at times the preferred method for preparing thiolanhydride compounds for the thiolanhydride can be recovered from the water and little subsequent purification is necessary to recover a useable material.

The term vinyl polymer as used herein denotes those solid homopolymers, copolymers, or terpolymers which require heat stabilization made from ethylenically unsaturated monomers by an addition polymerization reaction. Included within the definition of ethylenically unsaturated materials useful in the preparation of polymers suitable for the practice of the present invention are the vinyl halide monomers of the formula:

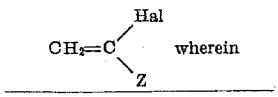

wherein

Z can be selected from halogen or hydrogen and Hal is halogen for example, vinyl chloride, vinyl bromide, vinylidene chloride and the like; mono-olefinic hydrocarbons such as ethylene and propylene; styrene and its nuclear, alpha-alkyl or aryl substituted derivatives such as p-methyl or butyl styrene; alphamethyl or propyl styrene; phenyl styrene and halogenated styrenes such as alpha-chlorostyrene; mono-olefinically unsaturated esters including vinyl esters, e.g., vinyl acetate, vinyl stearate and vinyl benzoate; alkyl methacrylates, e.g. methyl and propyl methacrylate; alkyl crotonates; alkyl acrylates, e.g., methyl acrylate, hydroxy ethyl acrylate, and tertiary butylamino acrylate; isopropenyl esters; isopropenyl halides; vinyl esters of halogenated acids; alkyl and methallyl esters; esters of alkenyl alcohols; haloalkyl acrylates; alkyl alpha-cyano acrylates; maleates e.g. monomethyl maleate, diethyl maleate; fumarates e.g., monethyl fumarate and dimethyl fumarate; diethyl glutaconate; mono-olefinically unsaturated organic nitriles such as fumaronitrile, acrylonitrile and methacrylonitrile; monoolefinically unsaturated carboxylic acids such as cinnamic, maleic and fumaric and maleic anhydride and the like. Amides of these acids are also useful. Vinyl ethers and vinyl alkyl ethers, vinyl sulfides such as vinyl β-chloroethyl sulfide can also be utilized. Diolefinically unsaturated hydrocarbon containing two olefinic groups in conjugated relation and the halogenated derivatives such as butadiene-1,3 and 2 chloro-butadiene-1,3, can also be utilized to prepare polymers suitable for use in the practice of the present invention.

The terms vinyl halide polymer, ethylene polymer and propylene polymer are used herein to denote homopolymers, copolymers and terpolymers of the named monomer and suitable monomers which can be polymerized by an addition polymerization reaction. The following are examples of copolymers which can be used in the practice of the present invention: vinyl chloride-vinyl acetate, vinyl chloride-vinylidene chloride, vinyl chloride-acrylonitrile, vinyl chloride-maleate esters, vinyl chloride-vinyl ethers, vinyl chloride-ethylene, vinyl chloride propylene, ethylene-vinyl acetate, ethylene-acrylonitrile. The examples are illustrative only and are not intended to be exhaustive of the many copolymers whose stability can be enhanced by the compounds of the present invention.

The proportion of the hydroxy-naphthoic thiolanhydride of the present invention which must be employed to make satisfactory heat stabilized compositions will vary over a wide range depending upon the particular vinyl polymer, the degree of stabilization needed, the end use of the resin, the presence of plasticizers and co-stabilizing additives, as well as the time and temperature requirements of the final processing. The presence of a stabilizing amount of from about 0.01 percent to about 15 percent by weight of the compounds of the present invention will be sufficient for most applications, although the preferred range is from about 0.5 percent to about 7.0 percent by weight of compounds of the present invention based on the weight of the polymer.

The compounds of the present invention can be advantageously employed in combination with co-stabilizing additives known in the art. The preferred co-stabilizing additives are the organic phosphites, dialkyl and diaryl phosphonates, organic and inorganic sulfites such as $Na_2SO_3$, $NaHSO_3$ and $(RO)_2SO$ where R is an alkyl or arylalkyl radical, zinc soaps, phenolic antioxidants, mercaptides, organotin compounds such as dialkyltin carboxylates or mercaptides, alkylstannoic acids and alkylthiostannoic acids.

The compounds of the present invention can be incorporated into the polymer composition by methods familiar to one skilled in the art for the addition of similar material to the polymer blends such as by mixing in a ribbon mixer or by the intensive mixing of a Henschel$^{TM}$ or Welex$^{TM}$ mixer.

The novel compounds of the present invention can be prepared in accordance with procedures known in the art, as well as by the procedures of the following example:

EXAMPLE I

This example illustrates the preparation of 1-hydroxy-2-naphthoic thiolanhydride, i.e.

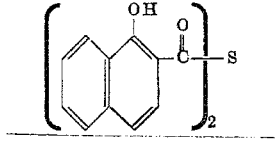

Step 1-Preparation of 1-hydroxy-2-naphthoyl chloride

To 200 grams of 1-hydroxy-2-naphthoic acid (1.06 mole) dissolved in 300 cubic centimeters of ethyl ether is added 48.7 grams (0.354 mole) of phosphorus trichloride. The mixture is refluxed with agitation for 6 hours under a nitrogen atmosphere. At the end of 6 hours the reaction mixture is permitted to separate into two layers. The two layers are separated. The solvent is stripped from the system under vacuum. The material that remains is 1-hydroxy-2-naphthoyl chloride.

Step 2-Preparation of 1-hydroxy-2-naphthoic thiolacid

A purge of nitrogen is started through 200 grams of pyridine saturated with $H_2S$ below 10° C. $H_2S$ is then started into the system at a low rate. To the pyridine $H_2S$ mixture is slowly added 51.5 grams (0.25 mole) of 1-hydroxy-2-naphthoyl chloride over a period of 1½ hours. The $H_2S$ is added continuously to the system and the temperature of the reaction mixture held below 10° C. The addition of $H_2S$ is continued for a half hour after the addition of the 1-hydroxy-2-naphthoyl chloride is completed. About 70 grams (2.1 mole) of $H_2S$ are added to the system. The reaction mixture is held for 16 hours at 10° C. under a nitrogen atmosphere. The reaction mixture is transferred to a 2 liter flask and acidified by the dropwise addition of a solution of 900 cubic centimeters of water and 200 cubic centimeters of concentrated sulfuric acid. The mixture is maintained below 10° C. during the addition of the sulfuric acid. The mixture is extracted with 300 cubic centimeters of chloroform and brought to room temperature. The organic layer is separated from the aqueous layer and the chloroform is stripped at reduced pressure. The material that remains is 1-hydroxy-2-naphthoic thiolacid.

Step 3- Preparation of 1-hydroxy-2-naphthoic thiolanhydride

Without any further purification 40.6 grams of the 1-hydroxy-2-naphthoic thiolacid prepared in the previous step is added to 250 cubic centimeters of benzene. A gas inlet tube is passed into the solution and a moderate nitrogen purge passed through the system. 1-hydroxy-2-naphthoyl chloride in the amount of 40 grams is added to the system at room temperature and the reaction mixture refluxed until no more HCl is generated by the reaction.

The reaction mixture is then stripped of low boiling material under vacuum and the 1-hydroxy-2-naphthoic thiolanhydride crystallized from the remaining material. The crystallized material can be purified by crystallization from a solvent.

EXAMPLE II

This example illustrates the preparation of 2-hydroxy-3-naphthoic thiolanhydride, i.e.

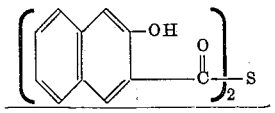

Step 1 - Preparation of 2-hydroxy-3-naphthoyl chloride

The preparation of 2-hydroxy-3-naphthoyl chloride is accomplished according to the procedure of H. Meyer, Monat-Scheften fur Chemie 22, 790, involving the reaction between thionyl chloride and 2-hydroxy-3-naphthoic acid.

Step 2 - Preparation of 2-hydroxy-3-naphthoic thiolacid

A total of 103 grams (0.50 mole) of 2-hydroxy-3-naphthoyl chloride is slowly added dropwise over a 1 hour period, at 10°–20° C., to a stirred saturated solution of hydrogen sulfide in 400 g. of dry pyridine through which $H_2S$ is being bubbled. The reaction mixture is then stirred for three more hours at 25° C. after the addition of the acid chloride while $H_2S$ is being passed through it. It is then warmed to 40° C., stirred for an additional 2 hours and then diluted with 500 ml. of chloroform. A total of 500 ml. of water is then added with stirring. The aqueous and organic layers are separated and the organic layer is washed with dilute HCl until all the pyridine is removed whereupon it is then dried and distilled under reduced pressure in a nitrogen atmosphere. The material remaining is the desired 2-hydroxy-3-naphthoic thiolacid.

Step 3 - Preparation of 2-hydroxy-3-naphthoic thiolanhydride

To a solution of 68 g. of the thiol acid in 250 ml. of dry benzene, there is added 69 g. of the acid chloride and the solution is refluxed until there is no further evolution of HCl. The solution is next washed once with 50 ml. of cold water and then dried. The benzene is distilled off and the thiol anhydride remains as the residue. It is purified by recrystallization from ligroin.

EXAMPLE III

This example illustrates the preparation of 2-hydroxy-1-naphthoic thiolanhydride, i.e.

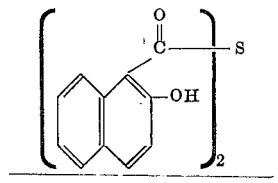

Step 1 - Preparation of 2-hydroxy-1-naphthoyl chloride

The preparation of 2-hydroxy-1-naphthoyl chloride is accomplished according to the procedure of H. Meyer, Monat-Scheften fur Chemie 22,790 involving the reaction between thionyl chloride and 2-hydroxy-1-naphthoic acid.

Step 2 - Preparation of 2-hydroxy-1-naphthoic thiolacid

A total of 103 grams (0.50 mole) 2-hydroxy-1-naphthoyl chloride is slowly added, dropwise, over a one hour period, at 10°–20° C., to a stirred saturated solution of hydrogen sulfide in 400 g. of dry pyridine through which $H_2S$ is being bubbled. The reaction mixture is then stirred for three more hours at 25° C. after the addition of the acid chloride while $H_2S$ is being passed through it. It is then warmed to 40° C., stirred for an additional 2 hours and then diluted with 500 ml. of chloroform. A total of 500 ml. of water is then added with stirring. The aqueous and organic layers are separated and the organic layer is washed with dilute HCl until all the pyridine is removed whereupon it is then dried and distilled under reduced pressure in a nitrogen atmosphere. The material remaining is the desired 2-hydroxy-1-naphthoic thiolacid.

Step 3 - Preparation of 2-hydroxy-1-naphthoic thiolanhydride

To a solution of 68 g. of the thiol acid in 250 mole of dry benzene, there is added 69 g. of the acid chloride and the solution is refluxed until there is no further evolution of HCl. The solution is next washed once with 50 ml. of cold water and then dried. The benzene is distilled off and the thiol anhydride remains as the residue. It is purified by recrystallization from ligroin.

EXAMPLE IV

A number of stabilized polymer compositions are prepared by intimately admixing a particulate sample of each of the below listed polymers with 3.0 percent, by weight of each polymer sample, of one of the novel stabilizers of this invention as listed hereinbelow. The individual stabilizer is admixed with the particulate polymer by a means suitable for the particular polymer being evaluated. After mixing, the stabilized composition is tested by conventional milling on a heated two roll mill to determine its heat stability. The mill rolls are heated to a temperature which is sufficient to permit milling of the polymer and which is also sufficiently high to degrade an unstabilized sample of the same polymer in two hours. Samples are taken from the mill every 10 minutes and evaluated. Unmilled samples are fluxed to form a homogeneous composition and are aged at ambient temperatures. In each case, the stabilizers of this invention are found to provide enhanced stabilization to each of the polymers with which they are admixed.

The polymers evaluated by the above procedure are:
Polyethylene (density 0.915)
Polyethylene (density 0.945)
Polypropylene
Polyvinyl chloride
Polyvinylidene chloride
Styrene-acrylonitrile-butadiene copolymer (ABS Type B)
Styrene-acrylonitrile-butadiene copolymer (Type G)
Vinyl chloride:vinyl acetate copolymer (90:10)
Vinyl chloride:acrylonitrile (90:10)

The stabilizers thus evaluated are:
1-hydroxy-2-naphthoic thiolanhydride
2-hydroxy-3-amyl-1-naphthoic thiolanhydride
2-hydroxy-1-naphthoic thiolanhydride
2-hydroxy-3-naphthoic thiolanhydride Variations may be made in proportions, procedures and materials without departing from the scope of this invention as defined in the following claims.

What is claimed is:
1. Compounds of the formula:

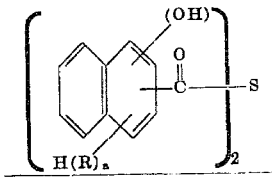

wherein H(R) is selected from the group consisting of alkyl, alkyl halide and alkoxy containing from one to about 12 carbon atoms and $a$ is an integer having a value of from zero to 1 inclusive.

2. The compounds of claim 1 wherein $a$ is zero.
3. The compound of the formula:

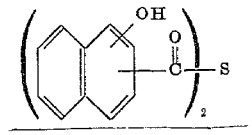

4. 1-hydroxy-2-naphthoic thiolanhydride.
5. 2-hydroxy-1-naphthoic thiolanhydride.
6. 2-hydroxy-3-naphthoic thiolanhydride.

* * * * *